Aug. 21, 1945.  E. B. HAMMOND ET AL  2,382,991

RANGE FINDER

Filed Sept. 17, 1942

INVENTORS:
E. B. HAMMOND
D. J. CAMPBELL
BY Herbert H. Thompson
ATTORNEY.

Patented Aug. 21, 1945

2,382,991

UNITED STATES PATENT OFFICE 2,382,991

RANGE FINDER

Edmund B. Hammond, Brooklyn, and David J. Campbell, Richmond Hill, N. Y., assignors to Sperry Gyroscope Company, Inc., Brooklyn, N. Y., a corporation of New York Application September 17, 1942, Serial No. 458,716

5 Claims. (Cl. 88—2.3)

This invention relates to an optical instrument and method by which an estimated range of a distant object of at least one known dimension may be determined by an observer.

One of the features of the invention resides in the use in the optical system for the range finder of a reticle formed to include a plurality of concentric circles whose respective diameters are indicative of different ranges.

Another feature of the invention consists in the inclusion in the optical system of the range finder of a lens which produces an enlarged image of the defined type of reticle and also includes means for superimposing the enlarged image of the reticle on the viewed object.

Still a further feature of the invention resides in the employment in the range finder of a number of individual reticles each of which is formed of a plurality of range indications, the reticles being arranged in spaced relation on a movable plate and respectively corresponding to various different known dimensions of the objects to be observed.

The range finder of the present invention is particularly adapted for use in estimating the range of an airplane with a known wing spread or fuselage dimension although obviously the same is not limited to use for targets of this character.

Other features and structural details of the invention will be apparent from the following description when read in connection with the accompanying drawing, wherein Fig. 1 is a front elevation of a range finder constructed in accordance with the present invention.

Figure 1:
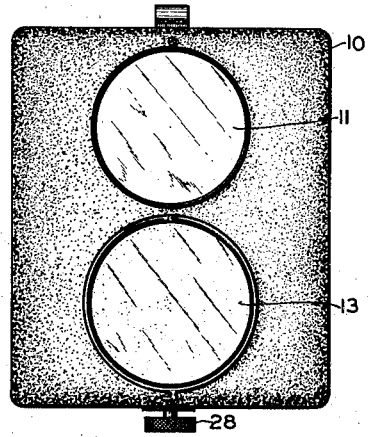
Figure 2:
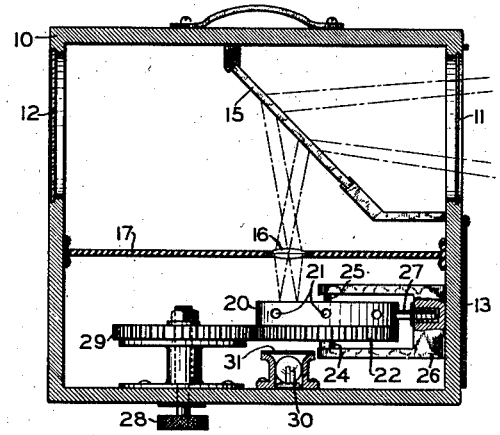
Fig. 2 is a side elevation of the range finder with the casing thereof shown in section.
Figure 7:
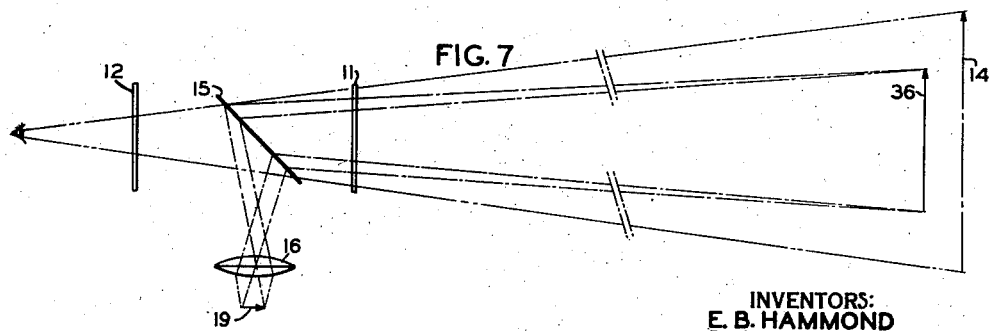
Fig. 7 is a diagrammatic view illustrating the principle of operation of the improved range finder.

With reference to Figs. 1 and 2 particularly of the drawing, the improved range finder is shown in the form of a box-like casing 10 having front and rear windows, respectively indicated at 11 and 12 which are situated in oppositely disposed walls of the casing. A light filter 13 is pivotally mounted exteriorly of the casing, the same being movable to a position in which the same covers the window 11 if desired. In use, the box casing may be held in the hand of the observer or may be suitably mounted on a tripod or other stand. The observer positions the box casing so that the object or target to be observed is seen directly through the respective windows 12 and 11 of the instrument. As shown in Fig. 7 the field of view of the observer is indicated by the line 14. The optical system of the range finder consequently includes means through which a distant object is viewed.

The interior of the box-like casing includes an optical means for superimposing an image of a reticle, which is hereafter more particularly described, in the field of view that the observer has of the object. This means in the present instance is shown in the form of an angularly positioned transparent glass plate 15. Plate 15 is disposed in 45° relation with respect to the axis of sight of the observer through the windows 12 and 11. Retaining arms are provided within the box casing for fixedly mounting the inclined plate in position. It will be understood that inasmuch as plate 15 is clear glass it does not obstruct the observer's view of the object or target. Further included in the optical system of the improved range finder is a lens 16 mounted in the shelf 17 within the casing 10 which produces an enlarged image of the reticle.

Figure 4:
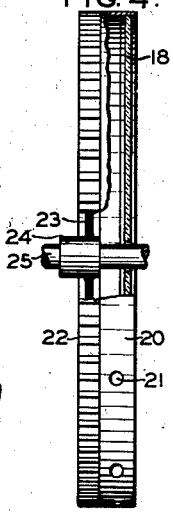
Fig. 4 is a detail end elevation of the reticle holding part.
Figure 5:
Fig. 5 is a detail view showing a portion of the form of reticle in which the plate is translucent and the circles thereon are transparent.
Figure 3:
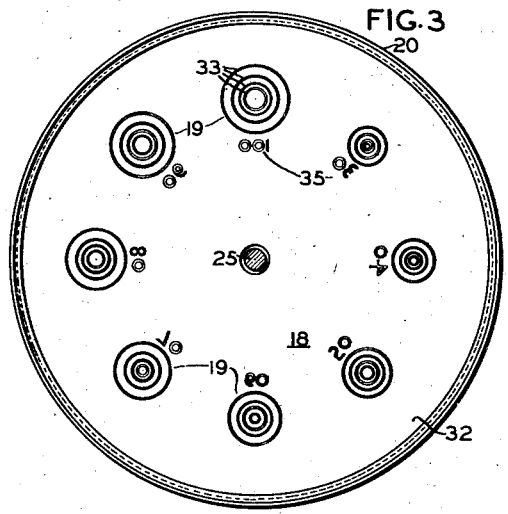
Fig. 3 is an enlarged detail plan view of the reticle employed in the improved range finder.

Within the box casing 10 and below the shelf 17 is situated a movable plate 18, Fig. 3, having a number of individual reticles as indicated at 19, eight in the present instance, each of which is formed of a plurality of range indicating circles. With particular reference to Figs. 4 and 5, the disc-shaped reticle plate 18 is suitably mounted within an annular member 20 whose peripheral surface includes rounded indentations 21 and gear teeth 22. Member 20 includes spokes 23, a hub 24 and shaft 25 and is rotatably mounted between two spaced bearings of suitable construction situated in the respective extending arms of a bifurcated piece 26 which is fixed to the interior side wall of the casing. The mechanism provided for setting the plate 18 to position a desired reticle 19 in the optical system of the range finder includes a yieldably held detent 27, situated in the fixed piece 26, whose end engages the respective spaced indentations 21 in the annular member to perform this function. It will be understood that only one of the reticles on the plate 18 is included in the optical system of the range finder at any given time. Each reticle 19 when properly positioned is included in the primary focal plane of the lens 16. In accordance with the teaching of the invention the respective reticles are formed to include a plurality of concentric circles whose respective diameters are indicative of different ranges. The annular member is turned by the observer through means of a knob 28 and gear 29 which meshes with the gear teeth 22. The optical system of the instrument also includes a light source such as bulb 30, the light of which is directed upon the reticle through a diffusing glass 31.

Figure 6:
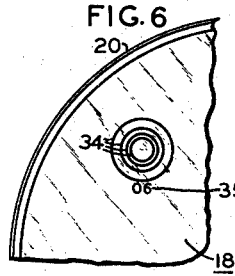
Fig. 6 is a detail view of a modified form of reticle.

With reference to Fig. 5, the plate 18 is shown as constructed of glass having a translucent covering or emulsified surface 32 and the respective circles 33 thereon, four being shown, for each of the reticles are formed by leaving transparent areas in the glass. In the type of reticle plate shown in Fig. 6, the plate 18 is formed of transparent glass, and the respective concentric circles for a particular reticle are provided by the relatively heavy opaque lines thereon indicated at 34.

Each of the respective reticles 19 are designed for use in viewing an object or target of at least one known dimension, for example the small reticle on the plate 18 may be employed in determining the range from the observer of an airplane whose wing spread or fuselage dimension is thirty feet. The other separate reticles are designed for use in the system when the known dimension of the object is respectively either forty, fifty, sixty, seventy, eighty, ninety or one hundred feet. With the proper reticle in use for a given object, the superimposed image of the circles of the reticle with respect to the object is viewed by the observer. A comparison is then made by the observer of the width of the known dimension of the object when positioned diametrically with relation to the circles on which the object is superimposed. Inasmuch as the diametrical size of the outside circle of the reticle is designed to give a range indication of five hundred yards, the second circle of one thousand yards, the third circle of fifteen hundred yards, and the inner circle of two thousand yards, the observed size of the object with relation to the circles when the same are properly related enables the observer to closely estimate the actual range of the object from the instrument.

To provide a means for indicating to the observer the particular reticle positioned in the optical system of the range finder, numerical indications 35 of the object dimensions for each reticle 19 are included on the reticle plate 18. As will be observed in Fig. 7, the secondary focal length of the lens 16 is such as to provide an enlarged image of the reticle to focus within the field of view of the observer. In arriving at the size of the respective reticle circles, the same were calculated in accordance with the following equation, $f/d = R/T$. $D$. where $f$ is the primary focal length of the lens 16, $d$ is the diameter of one of the circles of a particular reticle 19, $R$ is the range of the object from the observer which is substantially the secondary focal length of the lens 16 and $T$. $D$. corresponds to the actual size of the known target or object dimension. As shown in Fig. 7, the enlarged image of a given reticle is indicated at 36.

The method of use of the described range finder in estimating the range of a given target or object with at least one known dimension consists in simultaneously viewing the object and in superimposed relation thereto, the image of the reticle 19 on the plate 18 which is designed to correspond with the known target dimension. The observer completes his estimation by comparing the observed width of the known dimension of the object with relation to the enlarged image of the concentrically arranged circles forming the given reticle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A range finder having an optical system including means through which a distant object of one known dimension is viewed, a movable plate having a number of individual reticles respectively corresponding to particular object dimensions each of which is formed of a plurality of range indicating circles, mechanism for setting said plate to position a desired reticle in the optical system of the range finder, and optical means for superimposing an enlarged image of the desired reticle on the viewed object.

2. A range finder as claimed in claim 1, which further includes means for indicating to an observer the particular reticle positioned in the optical system of the range finder.

3. In a range finder having an optical system including means through which an object may be viewed by an observer, a plurality of reticles each formed of a plurality of concentric range indicating circles of graded sizes, the reticles respectively corresponding to particular object dimensions, optical means selectively associable with one of said reticles for superimposing an image of the associated reticle upon the image of the viewed object, and manual means for associating any desired reticle with said optical means.

4. In a range finder having an optical system including means through which an object may be viewed by an observer, a movable plate having a plurality of individual reticles each formed of a plurality of concentric range indicating circles of graded sizes, the reticles respectively corresponding to particular object dimensions, manually operable mechanism for setting said plate to position a desired reticle in the optical system of the range finder, and optical means for superimposing an image of the desired reticle on the image of the viewed object.

5. In a range finder having an optical system including means through which an object may be viewed by an observer, a movable plate having a plurality of individual reticles of graded sizes respectively corresponding to particular target dimensions, each reticle being formed of a pluraliy of concentric range indicating circles, said plate having a series of detents spaced circumferentially thereon, a spring-held member arranged to cooperate with said detents to tend to maintain said plate in a position such that the desired reticle lies in the optical system of the range finder, manually operable mechanism for setting said plate in any desired position, and optical means for superimposing an image of the desired reticle on the image of the viewed object.

EDMUND B. HAMMOND.
DAVID J. CAMPBELL.